2,616,183

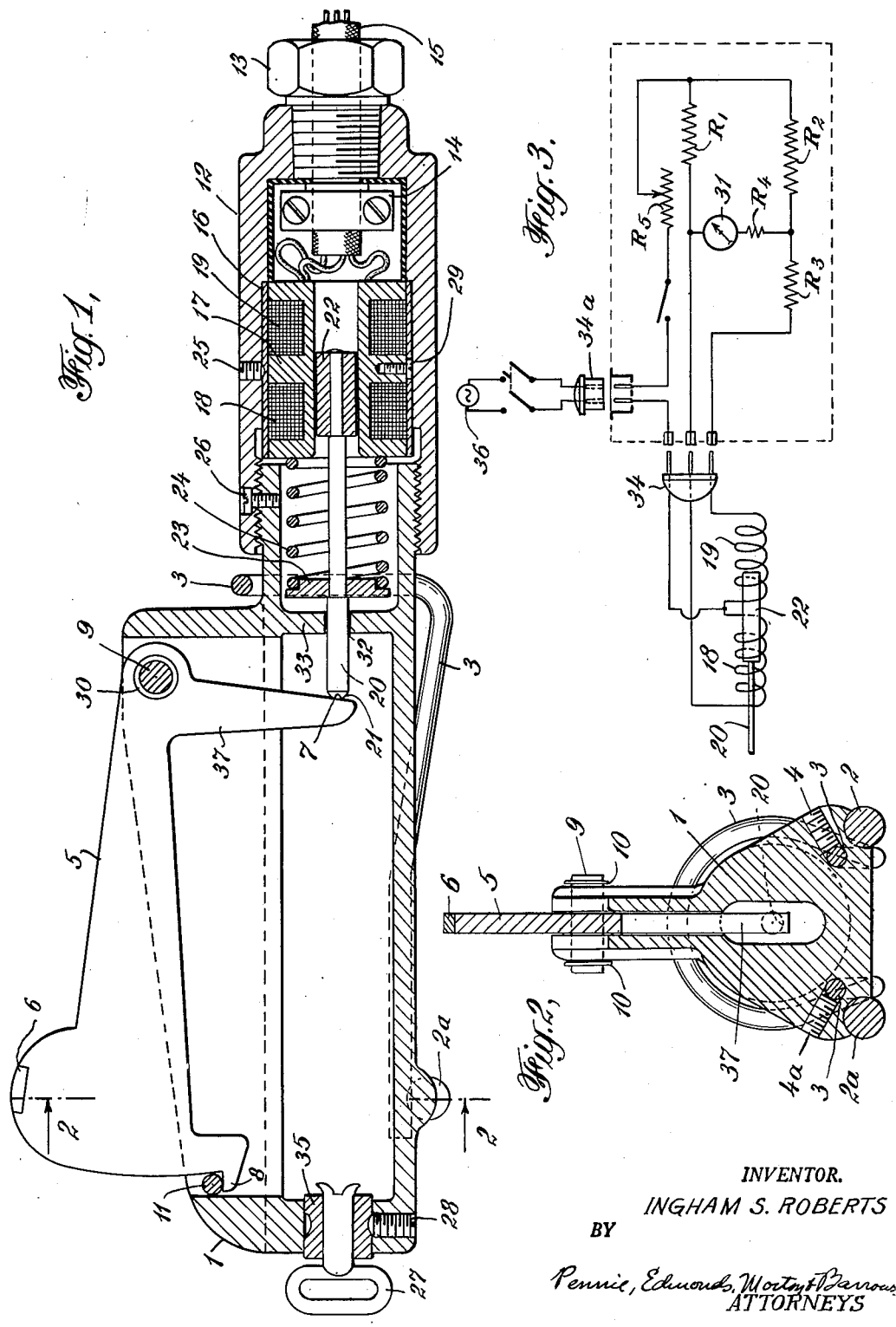
Nov. 4, 1952 — I. S. ROBERTS — 2,616,183
TUBE CALIPERING HEAD
Filed Oct. 11, 1947
INVENTOR.
INGHAM S. ROBERTS
BY
Pennie, Edmonds, Morton & Barrows
ATTORNEYS Patented Nov. 4, 1952

UNITED STATES PATENT OFFICE 2,616,183

TUBE CALIPERING HEAD

Ingham S. Roberts, Ridley Park, Pa.

Application October 11, 1947, Serial No. 779,261

3 Claims. (Cl. 33—178)

This invention relates to tube calipering, and comprises improved means for measuring internal cross-sectional dimensions of tubes and the like having relatively long and narrow interior passages. The apparatus of the invention, which is an improvement over that of my prior U. S. Letters Patent No. 2,235,533, granted March 18, 1941, is adapted to be passed lengthwise of a tube to be calipered so as to provide a continuous indication of the diameter or other transverse dimension of the passage being calipered as the apparatus is passed lengthwise thereof.

Like the apparatus described in my prior patent, that of the present invention is particularly useful in indicating, determining or measuring the variations in the transverse dimension of a relatively long, narrow conduit that is difficult of access, such for example, as in pipes or tubes used in boilers, refineries and elsewhere. In its preferred form the apparatus is capable of giving a continuous profile or chart of the transverse dimension along the conduit. This is accomplished by means of a calipering finger movable with respect to the casing of a measuring head to bear upon a wall of the conduit and which in moving varies an electrical characteristic of an element connected in an electrical circuit which includes means for indicating or recording variations in the transverse dimension of a longitudinal section of the conduit.

In general, the calipering apparatus in accordance with the present invention comprises an improvement over that of my prior patent in at least four respects. First, by replacing the formerly employed single coil by a double coil construction, considerably greater sensitivity is achieved, and likewise, errors due to temperature changes of the calipering head are minimized. The greater sensitvity is provided by an electrical circuit which gives a measurable response to a smaller movement of the calipering finger than heretofore. Second, the calipering head, instead of being formed essentially in one portion, is divided into two separable portions to permit interchange of calipering finger units for different measuring ranges or for measuring tubes of different types, viz., horizontal or vertical, while simultaneously providing for adjustment of certain internal components of the head. Third, the calipering head is so designed as to be useful for measuring tubes or conduits running in any direction from vertical to horizontal. Fourth, it avoids the need for the external balancing inductance required in connection with prior apparatus and thus provides cheaper and more simple equipment.

The invention will be better understood from the following description considered in connection with the accompanying drawings which illustrate a preferable form of the calipering apparatus, and wherein Fig. 1 is an elevational view, partly in cross-section, of the measuring head;

Fig. 2 is a sectional view taken along the line 2—2 of Fig. 1; and

Fig. 3 is a wiring diagram of the connections of the electrical measuring circuit in which the double coil contained in the calipering head is connected in a bridge circuit.

Referring now to Figs. 1 and 2 of the drawing, the measuring or calipering head comprises a housing 1 of generally cylindrical shape and which is designed to have a low center of gravity, viz., the casing and the component parts enclosed therein are proportioned so that the center of gravity is in the bottom portion rather than in the top portion of the head considered as a whole. As shown in Fig. 1, this distribution of weight or mass is achieved by locating the heaviest components, including coils 18, 19 and armature 22, or the greatest portion of them, in the casing so as to be below the longitudinal axis of any tube in which the head would be employed. This causes the head to ride along the bottom of the tube to be measured and to resist any overturning moment which may result from twisting of the electrical cable which is attached to one end of the casing. The housing 1 is supported at the bottom on two contact points 2 and 2a which preferably may comprise two tungsten carbide balls brazed integrally to the housing. These two contact points, with point 6, comprise an isosceles triangle of which point 6 is the apex. Additionally, the housing is supported on the bottom by a spring 3 of steel wire, the ends of which are secured in the bottom portion of the housing near the front end thereof by suitable set screws 4, 4a. This spring is formed in a loop, a portion of which is spaced away from the head rearwardly from the front end of the head, as illustrated. Thus spring 3 supports the rear element of the calipering head, tending to maintain the calipering head as a whole more nearly parallel to the longitudinal axis of the tube, assuring contact with the surface of the tube wall only at the intended points of contact and preventing overheating due to contact with hot tube walls.

The caliper finger 5 may assume any of several possible forms, but in the preferred embodiment herein described it comprises an L-shaped steel arm carrying on a rounded portion thereof a contact point 6 preferably of tungsten carbide, silver soldered in place, to provide greater wear resistance at the point where the finger is in contact with the inner surface of the tube wall. The contact point 6 is positioned in the same transverse plane as the other two contact points 2 and 2a, so as to form an isosceles triangle of which point 6 is the apex, as is more clearly shown in Fig. 2. Beneath the contact point, a short extension of the finger forms a toe 8 which cooperates with a stop pin 11 secured to the housing 1 to limit the outward movement of the contact finger. The stop 11 may be of stainless steel and may be adjustable if desired, but in practice such adjustability has not been found to be ordinarily necessary.

To provide for inward and outward movement of the finger with respect to the remainder of the calipering head, the finger 5 is pivoted to the casing 1 by a pivot pin 9, preferably of stainless steel, which passes through a suitable brass bushing 30 forced into a hole in the finger 5. Pin 9 is held in place by resilient retaining rings 10 (Fig. 2) which fit into suitable grooves formed in the pin. Below the pivot 9, an arm portion 37 extends downwardly (approximately at 90° to the horizontal portion) as a part of finger 5. At the end portion of arm 37 is a contact surface 7 which, like the corresponding contact surface on toe 8, preferably should be hardened. Opposite the hardened contact surface 7, a transverse guide piece 33 is provided to support the end of rod 20. Although this element is shown to comprise a part of the rear wall of the front section of the head, it may assume any form which would provide the equivalent function.

In the forward or front wall of the front casing section is a swivel traction ring 27 which passes through a bushing 35 which, in turn, is held in place in the casing by a set screw 28. By locating this ring on the longitudinal axis of the coils 18, 19, the tendency of the head to over-turn is further prevented.

The rear section of the calipering head comprises a housing 12 which encloses the components shown in the drawing. Housing 12, as well as housing 1, may advantageously be of bronze, provided the head is to be used only for calipering tubes which are horizontal, or approximately so. However, if the head is to be used for measurement of vertical tubes, or vertical and horizontal tubes, it is preferable that the casing 12 be of a light-weight material such as aluminum. At the rear end of casing 12 is a strain-relief fitting 13 which, if provided with a pressed rubber insert, serves to make the housing dustproof and to transfer part of the strain from the insulated cable 15 to the calipering head. A screw clamp 14 transfers the remainder of the strain from the three-conductor cable 15 (preferably neoprene covered) to the housing. The forward end of the rear section 12 is fitted with suitable means for coupling that section to the front section 1. Such coupling means may usefully comprise simple screw threads so that the rear section, for example, screws over a complementary portion of the front section, as shown. Such a screw-threaded coupling also permits horizontal adjustment along a common axis of the two sections for the purpose later to be described. The desired adjustment may be maintained by locking means such as the dowel screw 26 which locks the two sections together.

As above indicated, the described construction which permits the rear section of the head to be detached from the front section permits the use of the same electrical apparatus, both within the measuring head and external thereto, to be employed with interchangeable front sections which include the calipering fingers. Thus, the apparatus is readily adapted for different measuring ranges, viz., for measuring tubing of different diameters or for measuring special types of tubing, or tubing disposed vertically rather than horizontally. For example, the construction of the present invention would permit of ready substitution of a front section having, say, three movable calipering fingers as described in the mentioned Patent 2,235,533.

Within the housing 12 of the rear section, is a coil unit comprising a spool form 17, preferably of insulating material such as a phenol condensation product, having two adjacent slots in which two coils of wire 18 and 19 are wound. In one embodiment of the invention these coils were each composed of about 3,000 turns of No. 36 gauge-enamel-covered copper wire. The coils are connected in series with taps taken from the extreme terminals of the two coils and from the center point (see Fig. 3). The spool form 17 with its coils may preferably be covered with a shell 16 of steel tubing which is secured to the spool form by a dowel screw 29, which thus completes the coil unit. This shell not only serves as a mechanical protection to the coil windings but also as a magnetic shield to protect the fields of the coils from extraneous influences which would tend to decrease the sensitivity of accuracy of the device. The coil unit is held in place within the casing 12 by means of a set screw 25.

Spool 17 is formed with a central bore, as shown, to accommodate an armature or core 22 of magnetic material such as annealed mild steel. The core 22 should be proportioned to slide like a piston along the longitudinal axis of and within the bore of the coil form and be of such length with respect to the positions of the coils 18 and 19 that in moving in either direction the core will decrease the magnetic effect on one coil and will simultaneously increase the magnetic effect on the other coil, although the effect will reverse when the direction of movement is reversed. Core 22 is caused to move in and out within the bore of the coil-form by means of a push rod 20 which, for example, may be of stainless steel having a rounded tungsten carbide tip 21 on the end to decrease friction and wear at this point. An helical compression spring 24 is inserted between the inside end of the coil form 17 and a spring pressure plate 23 secured to rod 20. Spring plate 23 may be of any suitable material, but an insulating material such as that used for the coil form is satisfactory. The action of spring 24 is to move the rod 20 and core 22 to the left in the drawing, so as to urge the bearing tip 21 of rod 20 against the bearing surface 7 of arm 37. It will, therefore, be seen that by turning casing 12 with respect to casing 1 the rear section including coils 18 and 19 can be moved along the horizontal axis with respect to the front section including arm 37. In this manner an adjustment is provided of the means which mechanically links the calipering finger with the armature in respect to the magnetic fields of the coils. A close running fit should be made between the push rod 20 and the sides of hole 32 in guide piece 33, as well as between core 22 and the central bore in form 17, in order to secure and maintain proper alignment of the core and rod to minimize friction and side-play.

The electrical measuring or indicating circuit included in the invention is diagrammatically illustrated in Fig. 3. Coils 18 and 19, physically represented in Fig. 1, are shown in Fig. 3 in their proper electrical connections with the remainder of the apparatus. It will be seen that these coils are connected in two conjugate arms of a Wheatstone bridge of which the other arms are represented by resistors $R_1$ and $R_2$. Resistor $R_3$ is in the same arm with coil 19. Any or all of the resistors may be adjustable if desired, although after once set, they would not normally be varied. A suitable voltmeter, galvanometer or recording meter 31 is connected in series with a resistor $R_4$ (if required) across one pair of conjugate points of the bridge, and a suitable source of alternating current 36 is connected across the other pair of conjugate points of the bridge. A self-rectifying type of A. C. voltmeter, which has a high resistance, has been found useful as meter 31. It is convenient to proportion the circuit elements to permit use of the usual A. C. power circuit as the source 36. Rheostat $R_5$ is connected in series with the electric power source to control the potential effectively impressed across the bridge. The portion of the apparatus enclosed within the dash line rectangle may be included in a suitable cabinet or box. To enhance the portability and convenience in use of the equipment, suitable sockets and plugs 34, 34a may be provided for attachment and detachment of the calipering head and power source, respectively.

As previously pointed out, at least three distinct advantages over the apparatus of the invention of the mentioned patent result from the described double coil arrangement in its association with the Wheatstone bridge circuit shown in Fig. 3. It will be seen that because of the fact that electrically and magnetically similar coils 18 and 19 are connected in conjugate arms of the bridge, from which it follows that the effective impedance of one coil is increased as the impedance of the other coil is equally decreased, a given movement of the core 22 resulting from a given movement of the contact point 6 on the caliper arm 5 will produce twice as much electrical effect on the bridge balance, viz., in respect to the indication of meter 31, than would be the case if the impedance of a coil in only one of the bridge arms were changed. Furthermore, this balanced coil and circuit arrangement minimizes the error which would otherwise be introduced into the reading of meter 31 in the rather common event that the tube being calipered is hot, and especially when the heat varies from one part of the tube to another. In the present arrangement, when the coils 18 and 19 are subjected to change in temperature the change in resistance of each coil is substantially equal, and thus the resistance change is balanced out automatically in the bridge, whereas if only one coil were employed the change of resistance (which would be of unknown value) might cause a material error in the reading. Lastly, the construction and apparatus of the present invention is cheaper and simpler than that of the mentioned patent because in the arrangement of the present invention it is unnecessary to include in one of the conjugate arms an adjustable inductance to electrically balance the inductances of the coil in the calipering head.

In operation, the apparatus of the present invention is so simple that it may readily be employed by operators not especially skilled. For example to caliper a tube, as in the case of a petroleum still, a steel tape or fish wire having a spring clip on its free end is pushed through the tube by a first operator. A second operator at the other end of the tube fastens the clip to the swivel ring 27 on the calipering head and signals to have the tape drawn through the tube, watching the meter or recorder as the head progresses along the tube. The first operator detaches the steel tape when the head reaches his end of the tube, and then the second operator draws the head back to its starting point by pulling on the cable 15. During the return passage through the tube the meter may be read again as a check against the measurements first made. If the cable is marked at measured intervals, in feet and inches, for example, with metal or plastic rings, with paint, or otherwise, the position of the head in respect to any given meter indication may be ascertained by reading the distance marks against the end of the tube or other convenient fixed point.

When the caliper head is withdrawn from a tube, the contact finger 5 moves to its fully extended position which will result in approximately a maximum scale reading of the meter 31. It is convenient to mark this calibration point on the dial with a distinctive designation such as a red line. Then, before inserting the head in a tube to be calipered, the meter pointer may, if necessary, be set at this calibration mark by adjustment of resistor $R_5$. If the apparatus remains in correct adjustment the meter will indicate this same mark after the head is removed from the tube just calipered. Thus, the apparatus of this invention comprises, in reality, a mechanical comparator gage having an electrical indicator, because it measures the differential between the diameter corresponding to the maximum outward throw of the contact arm, indicated by the calibration mark, and any unknown smaller diameter. For this reason many errors and inaccuracies to which other types of calipering devices are subject, are, by this invention, effectively avoided or automatically compensated.

What is claimed is:

1. A tube-calipering head adapted to caliper the bore of a horizontal tube having a longitudinal axis, said head comprising a casing having a front section and a rear section, separable coupling means coupling the rear end of said front section to the front end of said rear section, whereby different front sections proportioned to caliper tubes of different diameters may be coupled, respectively, to the same rear section, a caliper finger mounted in said front section and extending from the top thereof so as to be movable substantially radially with respect to the tube to be calipered, resilient means urging said finger into continuous engagement with the tube, three caliper contact points adapted to bear on the inner surface of the wall of the tube to be calipered, a first of said points being carried on said finger, and the other two said points lying on hardened rounded surfaces rigidly attached to said front section, said three points lying in a plane transverse to the longitudinal axis of said head and forming an isosceles triangle of which said first point is the apex, said plane being positioned near the front end of said front section, at least one solenoid coil mounted in said rear section and having a longitudinal axis, an armature of magnetic material disposed for movement relative to said coil along the longitudinal axis thereof in response to movement of said finger, link means common to both said sections mechanically connecting said finger to said armature, the axis of said coil and thus the greatest portion of the mass of the components of said head, including said coil and said armature, being positioned below the longitudinal axis of any tube in which said head is adapted to be employed, said separable coupling means being adjustable along the longitudinal axis of said head to adjust the position of said armature in the magnetic field of said coil with respect to a given position of said contact finger.

2. A tube-calipering head comprising a casing having a front section and a rear section, separable coupling means securing said sections together, calipering contact means mounted in said front section and extending upwardly therefrom so as to be movable substantially radially with respect to the wall of the tube to be calipered, two hardened bearing members having curved surfaces extending from the bottom of said front section and disposed symmetrically in respect to a contact point on said contact means so as to form an isosceles triangle of which said point is the apex, said triangle lying in a plane transverse to the longitudinal axis of said head, resilient means urging said contact means into engagement with the tube, at least one solenoid coil mounted in said rear section and having a longitudinal axis, a cylindrical coil form in which said coil is wound, an armature of magnetic material disposed for movement relative to said coil along the longitudinal axis thereof in response to movement of said contact means, and link means extending into both said sections and mechanically connecting said contact means to said armature, said coupling means being adjustable along the longitudinal axis of said head for adjusting the position of said armature in the magnetic field of said coil with respect to a given position of said contact means in said front section.

3. A tube-calipering head comprising a casing having a longitudinal axis, said casing having a front section and a rear section threadedly coupled together, a caliper finger shaped as a bell crank lever pivotally-mounted on said front section having one of its legs extending substantially parallel to said longitudinal axis of the casing outward thereof and having its other leg extending inwardly from said one leg to intersect said longitudinal axis of the casing, a pair of spaced contact surfaces extending outwardly from the outer side of said front section and a third contact surface extending outwardly from the outer side of said one leg of the caliper finger, said three contact points forming the apices of a triangle lying substantially at right angles to said longitudinal axis of the casing, whereby the front section of the casing may be supported away from the inner wall of a tube being calipered, at least one solenoid coil fixedly mounted in said rear section and having a central bore extending along its length about said longitudinal axis of the casing, an armature of magnetic material movable within said bore to vary the reluctance of said solenoid coil, a rod connected at one end to said armature and extending therefrom along said longitudinal axis of the casing into contact with said other leg of the caliper finger, a spring pressure plate mounted on said rod between the solenoid coil and said other leg of the caliper finger, and a spring between one end of said solenoid and said spring pressure plate for urging said rod and said armature away from the solenoid coil to urge said other leg of the caliper finger outwardly, said one leg of the caliper finger and said third contact surface lying a sufficient distance outward from said longitudinal axis of the casing that the greatest portion of the mass of the components of said tube-calipering head will lie a substantial distance away from the longitudinal axis of any tube being calipered, whereby different front sections having different sized caliper fingers may be used with said rear section, and said front and rear sections may be adjusted relatively to each other to vary the position of the armature in said bore of the solenoid coil.

INGHAM S. ROBERTS.

REFERENCES CITED

The following references are of record in the file of this patent:

UNITED STATES PATENTS

| Number | Name | Date |
|---|---|---|
| 713,784 | Mellor | Nov. 18, 1902 |
| 1,431,615 | Wittner | Oct. 10, 1922 |
| 1,490,383 | Green | Apr. 15, 1924 |
| 1,928,457 | Mershon et al. | Sept. 26, 1933 |
| 2,095,405 | Aldegorgh et al. | Oct. 12, 1937 |
| 2,122,664 | Terry | July 5, 1938 |
| 2,147,329 | Willey | Feb. 14, 1939 |
| 2,235,533 | Roberts | Mar. 18, 1941 |
| 2,281,960 | Vacquier | May 5, 1942 |
| 2,348,643 | Poole | May 9, 1944 |
| 2,360,058 | Hohwart | Oct. 10, 1944 |
| 2,369,909 | Mestas | Feb. 20, 1945 |

FOREIGN PATENTS

| Number | Country | Date |
|---|---|---|
| 705,713 | Germany | May 7, 1941 |